(12) United States Patent
Jiang et al.

(10) Patent No.: US 12,706,544 B2
(45) Date of Patent: Aug. 11, 2026

(54) PROTECTION CIRCUIT OF FLYBACK CONVERTER AND CONTROL METHOD

(71) Applicant: Joulwatt Technology Co., Ltd., Hangzhou (CN)

(72) Inventors: Xianghua Jiang, Hangzhou (CN); Junming Zhang, Hangzhou (CN); Pitleong Wong, Hangzhou (CN); Xiangyong Xu, Hangzhou (CN)

(73) Assignee: JOULWATT TECHNOLOGY (HANGZHOU) CO., LTD, Hangzhou (CN)

( * ) Notice: Subject to any disclaimer, the term of this patent is extended or adjusted under 35 U.S.C. 154(b) by 391 days.

(21) Appl. No.: 18/478,897

(22) Filed: Sep. 29, 2023

(65) Prior Publication Data

US 2024/0120849 A1 Apr. 11, 2024

(30) Foreign Application Priority Data

Sep. 29, 2022 (CN) ......................... 202211203631.4
Nov. 29, 2022 (CN) ......................... 202211507185.6

(51) Int. Cl.
*H02M 3/335* (2006.01)
*H02M 1/32* (2007.01)
(Continued)

(52) U.S. Cl.
CPC ......... *H02M 3/33592* (2013.01); *H02M 1/32* (2013.01); *H02M 1/322* (2021.05);
(Continued)

(58) Field of Classification Search
CPC ........... H02M 3/33507; H02M 3/3353; H02M 1/344; H02M 1/32; H02M 1/322
See application file for complete search history.

(56) References Cited

U.S. PATENT DOCUMENTS

2007/0028595 A1 2/2007 Zeng et al.
2011/0103098 A1 5/2011 Wu et al.
(Continued)

FOREIGN PATENT DOCUMENTS

CN 113725820 11/2021
CN 113726165 11/2021
(Continued)

*Primary Examiner* — Sisay G Tiku
(74) *Attorney, Agent, or Firm* — Treasure IP Group, LLC

(57) ABSTRACT

Disclosed is a protection circuit of a flyback converter and a control method. The protection circuit comprises: an active discharge module, for providing a discharge path between a first current terminal and a second current terminal of a switch transistor in a resonance circuit, and controlling turning-on and turning-off of the discharge path according to a discharge enable signal; in the normal work state of the flyback converter, the discharge path is disconnected, the resonance circuit works, before the flyback converter is restarted, the discharge path is turned on for a predetermined time period to release charges stored in the resonance circuit, and the resonance current after the flyback converter is restarted is reduced to the safe work current of the second switch transistor. The resonance current is discharged before the flyback converter is restarted, thus reducing the resonance current and enhancing system stability and security.

23 Claims, 6 Drawing Sheets

(51) Int. Cl.
*H02M 1/34* (2007.01)
*H02M 3/00* (2006.01)

(52) U.S. Cl.
CPC ..... *H02M 3/33507* (2013.01); *H02M 3/3353* (2013.01); *H02M 3/01* (2021.05)

(56) References Cited

U.S. PATENT DOCUMENTS

2018/0337606 A1 11/2018 Aussenesse
2020/0328669 A1* 10/2020 Yang ........................ H02M 1/32
2022/0294358 A1* 9/2022 Wang ....................... H02M 1/14
2023/0090234 A1* 3/2023 Huang .............. H02M 3/33569 363/21.12
2023/0198415 A1* 6/2023 Xu .......................... H02M 1/32 363/21.12
2023/0223855 A1* 7/2023 Wang ................ H02M 3/33571 363/16
2024/0120831 A1* 4/2024 Jiang ................. H02M 3/33592
2024/0429827 A1* 12/2024 Xu .......................... H02M 1/08

FOREIGN PATENT DOCUMENTS

CN 114884356 8/2022
CN 113938020 B * 6/2024 .............. H02M 1/32

* cited by examiner

- Prior Art -

- Prior Art -

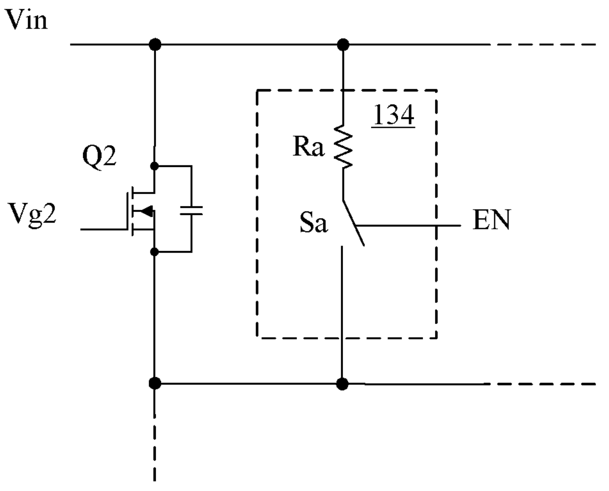
Fig.6
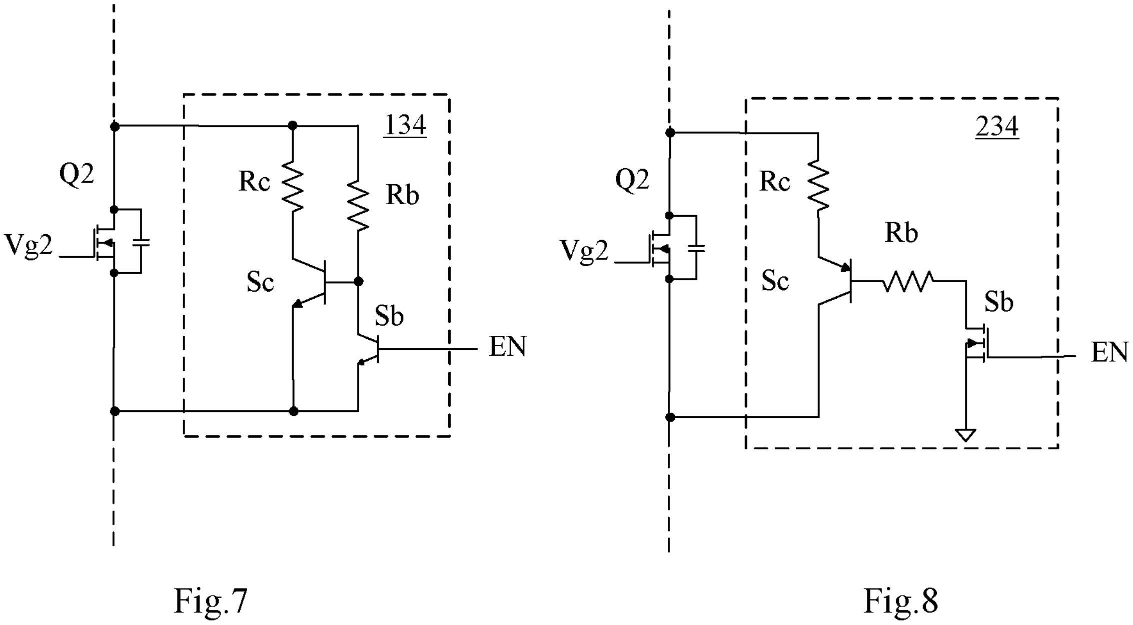
Fig.7
Fig.8

PROTECTION CIRCUIT OF FLYBACK CONVERTER AND CONTROL METHOD

CROSS-REFERENCE TO RELATED APPLICATION

This application claims priority to Chinese patent application No. 202211507185.6, filed on Nov. 29, 2022, published as CN115549457A on Dec. 30, 2022, and entitled "PROTECTION CIRCUIT OF FLYBACK CONVERTER AND CONTROL METHOD", and to Chinese patent application No. 202211203631.4 (not published), filed on Sep. 29, 2022, and entitled "PROTECTION CIRCUIT OF FLYBACK CONVERTER AND CONTROL METHOD", the entire contents of which are incorporated by reference.

FIELD OF THE DISCLOSURE

The present disclosure relates to the field of power electronic technology, more particularly, to a protection circuit of a flyback circuit and a control method.

DESCRIPTION OF THE RELATED ART

The flyback converter comprises, and electric energy is transmitted to the secondary edge winding of the transformer when the primary edge winding of the transformer is disconnected from the input power supply. The flyback converter has a simple circuit structure and low cost, and it has a wide input voltage range, and has been widely applied in various electronic equipment.

In some application scenarios of the flyback converter, the flyback converter uses the non-symmetrical half-bridge topology, or it also contains an active clamp circuit. In the flyback converter of the non-symmetrical half-bridge topology, at the primary edge of the transformer, the flyback converter not only includes a primary switch transistor connected between the input terminal and the primary edge winding of the transformer, but also includes an auxiliary switch transistor connected between the main switch transistor and the reference ground. In the flyback converter using the active clamp circuit, at the primary edge of the transformer, the flyback converter not only includes a primary switch transistor between the primary edge winding of the transformer and the reference ground, but also includes an auxiliary switch transistor and a capacitor connected in series with the primary edge winding of the transformer. The above two types of flyback converters also include an inductor and a capacitor that form the resonance circuit together with the auxiliary switch transistor.

In some cases, when both the primary switch transistor and the auxiliary switch transistor are turned off, the voltage on the capacitor will have a certain voltage amplitude; when the auxiliary switch transistor is turned on again, there is a voltage difference between the voltage of the capacitor and the voltage of the primary edge winding; at this time, resonance occurs between the capacitor and the inductor, and resonance current is generated; moreover, the amplitude of the resonance current is in positive correlation with the amplitude of the voltage; when the voltage on the capacitor is too large, the resonance current may exceed the safe work current of the auxiliary switch transistor to disenable the auxiliary switch transistor.

Therefore, it is necessary to provide improved technical solutions to overcome the above technical problems in the prior art.

SUMMARY OF THE DISCLOSURE

In view of this, the objective of the present disclosure is to provide a protection circuit of a flyback converter and a control method, wherein the first capacitor in the resonance circuit is discharged before the flyback converter is restarted to reduce the amplitude of the resonance current, so as to protect the switch transistor in the resonance circuit to enhance system stability and safety.

According to the first aspect of the present disclosure, there is provided a protection circuit of a flyback converter, the flyback converter comprises a transformer, a first switch transistor and a second switch transistor located at the primary edge of the transformer and connected between an input terminal of the flyback converter and a reference ground, and a first capacitor and a first inductor forming a resonance circuit when the second switch transistor is turned on; the protection circuit comprises: an active discharge module, for providing a discharge path between the first current terminal and a second current terminal of the second switch transistor, and controlling the turning-on and -off of the discharge path according to the discharge enabling signal, wherein in the normal work state of the flyback converter, the discharge path in the active discharge module is disconnected, and the resonance circuit works; before the flyback converter is restarted, the discharge path in the active discharge module is turned on for a predetermined time period to release the charges stored in the resonance circuit, and reduces the resonance current after the flyback converter is restarted to the safe work current of the second switch transistor.

Preferably, the active discharge module comprises a third switch transistor and a first resistor connected between the first current terminal and a second current terminal of the second switch transistor, and the third switch transistor is connected in series with the first resistor.

Preferably, the active discharge module further comprises a fourth switch transistor and a second resistor connected in series between the first current terminal and the second current terminal of the second switch transistor, and the control end of the third switch transistor is connected to the intermediate node of the fourth switch transistor and the second resistor, and the control end of the fourth switch transistor receives the discharge enabling signal.

Preferably, the third transistor and the fourth transistor are bipolar switch transistors respectively.

Preferably, the active discharge module further comprises a fourth switch transistor and a second resistor connected in series between the control end of the third transistor and the reference ground, and the control end of the fourth switch transistor receives the discharge enabling signal.

Preferably, the third switch transistor is a bipolar transistor, and the fourth switch transistor is a field effect transistor.

Preferably, the third switch transistor forms a positive PN node between the first terminal of the first capacitor and the control end of the third switch transistor, such that when the control end is connected to the reference ground, the third switch transistor is turned on, so as to turn on the discharge path.

Preferably, the first switch transistor and the second switch transistor are sequentially connected in series between the input terminal of the flyback converter and the reference ground.

Preferably, the second switch transistor and the first switch transistor are connected in series between the input terminal of the flyback converter and the reference ground.

Preferably, the flyback converter further comprises a second capacitor, and the second capacitor, the second switch transistor, and the first switch transistor are sequentially connected in series between the input terminal of the flyback converter and the reference ground.

Preferably, when the first switch transistor is turned off, the intermediate node between the first switch transistor and the second switch transistor has floating ground voltage.

Preferably, it further comprises a level conversion circuit for converting the discharge enabling signal from the first level with respect to the reference ground to the second level with respect to the floating ground voltage.

Preferably, it further comprises a discharge control circuit connected to the active discharge module, and generating the discharge enabling signal with the corresponding valid state according to the work state of the flyback converter.

Preferably, the discharge control circuit comprises a detection module for detecting the work state of the flyback converter, and generating the turning-on signal and the turning-off signal before the flyback converter is restarted, and control logics, for generating the discharge enabling signal according to the turning-on signal and the turning-off signal.

Preferably, the discharge control circuit comprises: a detection module, for detecting the work state of the flyback converter, and generating a tuning-on signal before the flyback converter is restarted; a time delay module, for starting to delay when the turning-on signal is valid, and generating a turning-off signal when the delay arrives a predetermined time period; and control logics, for generating the discharge enabling signal according to the turning-on signal and the turning-off signal.

Preferably, the detection module receives the first switch control signal of the first switch transistor and the second switch control signal of the second switch transistor, and generates at least one of the turning-on signal and the turning-off signal according to the first switch control signal and the second switch control signal.

Preferably, the detection module generates the turning-on signal when the duration that both the first switch control signal and the second switch control signal are in the invalid state exceeds at least one switch cycle.

Preferably, the detection module generates the turning-off signal when it detects a complementary level state of the first switch control signal and the second switch control signal in at least one continues switch cycle.

Preferably, the second switch transistor is also used as the active discharge module, and the discharge control circuit further comprise: a driving module, for providing driving signals when the second switch transistor works in a switch or linear state; and a selection module, for receiving the second switch control signal and the driving signal of the second switch transistor, and selecting one of the second switch control signal and the driving signal according to the discharge enabling signal, wherein, the second switch transistor is continuously turned on and conducts constant current discharge when the discharge enabling signal is valid, and is turned on and off according to the switch cycle when the discharge enabling signal is valid.

Preferably, the active discharge module comprises an additional transistor, and the discharge control circuit further comprises: a driving module, for providing driving signals when the transistor works in the switch or linear state, wherein the additional transistor is continuously turned on and conducts constant current discharge when the discharge enabling signal is valid, and is turned off when the discharge enabling signal is invalid.

Preferably, the detection module receives a system power-on signal or system error signal, and turns on the discharge path in the active discharge module for a predetermined time period before the system restart is finished.

According to the second aspect of the present disclosure, there is provided a control method of a flyback converter, the flyback converter comprising a transformer, a first switch transistor and a second switch transistor located at the primary edge of the transformer and connected between an input terminal of the flyback converter and a reference ground, and a first capacitor and a first inductor forming a resonance circuit when the second switch transistor is turned on, the control method comprising: providing a discharge path between a first current terminal and a second current terminal of the second switch transistor; in the normal work state of the flyback converter, disconnecting the discharge path to make the resonance circuit to work; and before the flyback converter is restarted, the discharge path is turned on for a predetermined time period according to the discharge enabling signal to release the charges stored in the resonance circuit, and the resonance current after the flyback converter is restarted is reduced to the safe work current of the second switch transistor.

Preferably, there is floating ground voltage at the intermediate node of the first switch transistor and the second switch transistor when the first switch transistor is turned off.

Preferably, it further comprises converting the discharge enabling signal from the first level with respect to the reference ground to the second level with respect to the floating ground voltage.

Preferably, it further comprises detecting the work state of the flyback converter, and generating the turning-on signal and the turning-off signal before the flyback converter is restarted; and generating the discharge enabling signal according to the turning-on signal and the turning-off signal.

Preferably, it further comprises: detecting the work state of the flyback converter, and generating the turning-on signal before the flyback converter is restarted; starting to delay when the turning-on signal is valid, and generating the turning-on signal when the delay achieves the predetermined time period; and generating the discharge enabling signal according to the turning-on signal and the turning-off signal.

Preferably, generating at least one of the turning-on signal and the turning-off signal according to the first switch control signal of the first switch transistor and the second switch control signal of the second switch transistor.

Preferably, generating the turning-on signal when the duration time that both the first switch control signal and the second switch control signal are in invalid state exceeds at least one switch cycle.

Preferably, generating the turning-off signal when it detects the complementary levels of the first switch control signal and the second switch control signal in at least one continuous switch cycle.

Preferably, the second switch transistor is also used as an active discharge module, the control method further comprising: obtaining a second switch control signal of the second switch transistor in the normal work cycle; obtaining a driving signal when the second switch transistor works in the work or linear zone, and selecting one of the second switch control signal and the driving signal as the control signal of the second switch transistor according to the discharge enabling signal, wherein the second switch transistor is continuously turned on and conducts constant current discharge when the discharge enabling signal is valid, and is turned on and off according to the switch cycle when the discharge enabling signal is invalid.

Preferably, confirming the system restart event according to the system power-on signal or the system error signal, and turning on the discharge path for a predetermined time period before the system restart is finished.

As for the flyback converter according to the embodiments of the present disclosure, when the flyback converter is restarted, the first capacitor in the resonance circuit of the flyback converter has pre-discharged, and thus during the first switch cycle of the restart, the voltage at the two ends of the first capacitor has reduced to the safe value, and it can well control the maximum value of the resonance circuit to be lower than the safe work current of the second switch transistor in the resonance circuit, and thus it can protect the second switch transistor and improve the reality of the flyback converter.

BRIEF DESCRIPTION OF THE DRAWINGS

FIG. 6 shows an equivalent circuit diagram of the discharge module in the flyback converter shown in FIG. 4;

FIG. 7 shows a schematic circuit diagram of a discharge module in the flyback converter shown in FIG. 6;

FIG. 8 shows a schematic circuit diagram of another discharge module in the flyback converter shown in FIG. 6;

DETAILED DESCRIPTION OF EMBODIMENTS OF THE DISCLOSURE

The following will describe in great details the preferred embodiments of the present disclosure by combining with the accompanying drawings; however, the present disclosure is not restricted to these embodiments. The present disclosure covers any replacement, modification, equivalent methods and solutions made within the sprits and scopes of the present disclosure.

In order to make the public have a thorough understanding of the present disclosure, specific details are described in the following preferred embodiments of the present disclosure, while those skilled in the art can totally understand the present disclosure without these details.

The present disclosure is described in more details by way of illustration by referring to the accompanying drawings in the following paragraphs. It should be noted that the accompanying drawings all use simplified forms and use imprecise ratios, and are merely for the objective of illustrating the embodiments of the present disclosure conveniently and clearly.

Figure 1A:
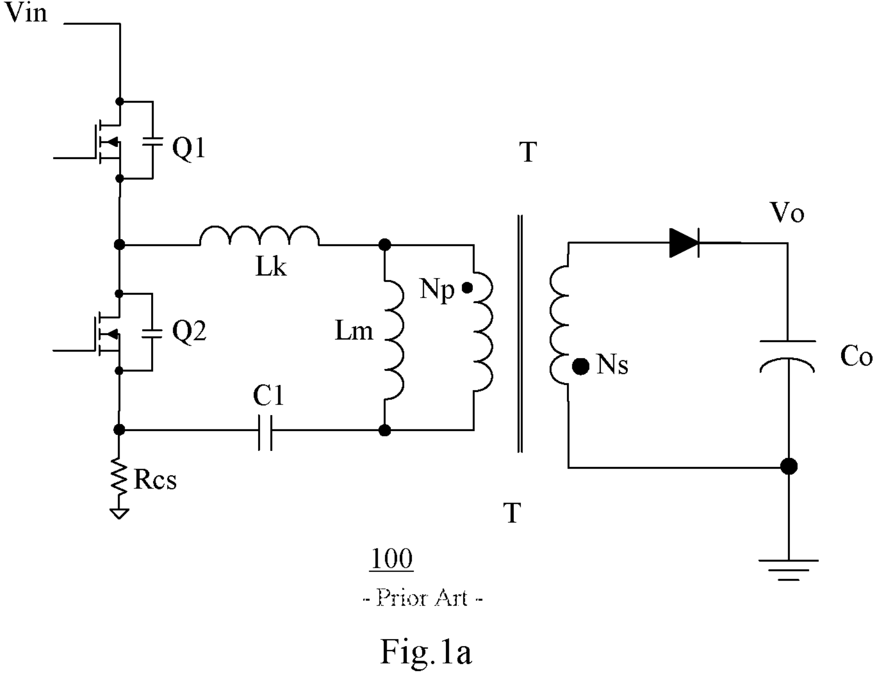
FIG. 1*a* shows a circuit block diagram of a non-symmetric half-bridge topology of a flyback converter according to prior art.

FIG. 1*a* shows a circuit block diagram of a non-symmetric half-bridge topology of the flyback converter according to prior art. For clarity, only the main circuit of the flyback converter is shown in drawing, while the switch control circuit for providing the switch transistor with switch control signals is not shown.

In the non-symmetric half-bridge topology shown in FIG. 1*a*, the flyback converter 100 comprises a transformer T having a primary edge winding Np and a secondary edge winding Ns, switch transistors Q1 and Q2 at the primary edge of transformer T, a first inductor Lk and a first capacitor C1, and diode D1 and an output capacitor Co at the secondary edge of transformer T.

At the primary edge of transformer T, the first switch transistor Q1 and the second switch transistor Q2 are sequentially connected between the input terminal of the voltage and the reference ground of the primary edge. In a possible embodiment, the first switch transistor Q1 and the second switch transistor Q2 are both NMOS field effect transistors. The primary edge winding Np of the transistor T, the first inductor Lk, and the first capacitor C1 are connected in series between the source and the drain of the second switch transistor Q2, and form a resonance circuit when the second switch transistor Q2 is turned on. The equivalent inductance of the primary edge winding of transformer T in the resonance circuit is excitation inductance Lm.

At the secondary edge of transformer T, diode D1 and the secondary edge winding Ns of transformer T are connected in series between the voltage output terminal and the reference ground of the secondary edge. The anode of the diode D1 is connected to the heteronymous terminal of the secondary edge winding Ns, so as to rectify the induced voltage inverse to the excitation voltage of the transformer T, to provide DC output voltage Vo. The output capacitor Co is connected between the voltage output terminal and the reference ground of the secondary edge, and filters the DC output voltage Vo to obtain a smooth voltage waveform. In an alternative embodiment, it may use a synchronous rectifying switch transistor to replace diode D1.

Preferably, the flyback converter further comprises a sampling resistor Rcs connected between the source of the second switch transistor Q2 and the reference ground, for obtaining the current flowing through the first switch transistor Q1 when the first switch transistor Q1 is turned on and the second switch transistor Q2 is turned off. Preferably, in small-power power supply applications, it may use the drain inductor of transformer T to replace the first inductor Lk.

Figure 1B:
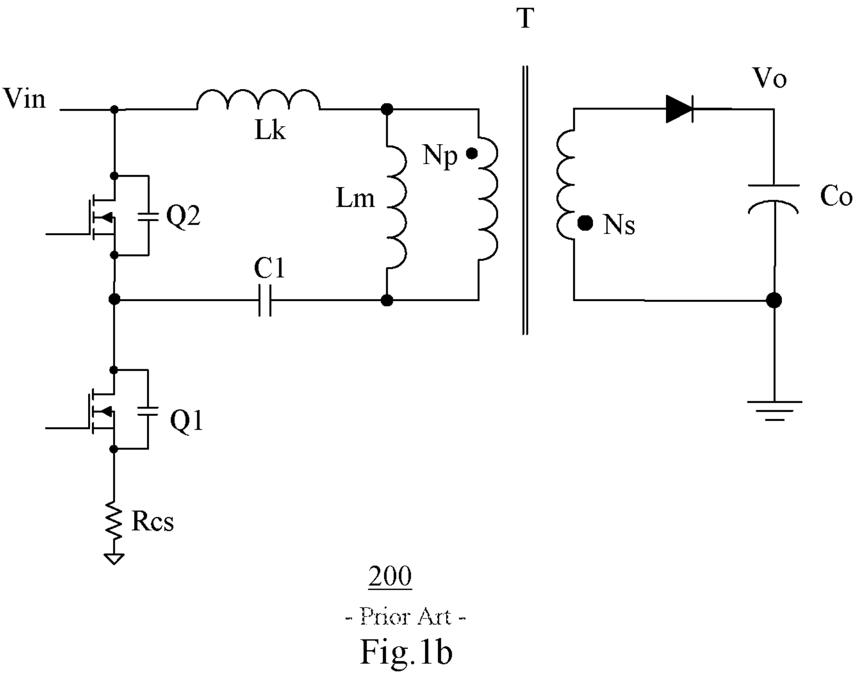
FIG. 1*b* shows a circuit block diagram of another non-symmetric half-bridge topology of a flyback converter according to prior art.

FIG. 1*b* shows a circuit block diagram of another non-symmetric half-bridge topology of the flyback converter according to prior art. For clarify, only the main circuit of the flyback converter is shown in Figure, and the switch control circuit for providing the switch transistor with control signals is not shown.

In the non-symmetrical half-bridge topology shown in FIG. 1*b*, the flyback converter 200 comprises a transformer T having a primary edge winding Np and a secondary edge winding Ns, switch transistors Q1 and Q2, a first inductor Lk and a first capacitor C1 located at the primary edge of transformer T, and a diode D1 and output capacitor Co located at the secondary edge of transformer T.

At the primary edge of transformer T, the second switch Q2 and the first switch transistor Q1 are sequentially connected in series between the voltage input terminal and the reference ground of the primary edge. In a possible embodiment, the first switch transistor Q1 and the second switch transistor Q2 are both NMOS field effect transistors. The primary edge winding Np of transformer, the first inductor Lk, and the first capacitor C1 are connected in series between the source and drain of the second switch transistor Q2, and form a resonance circuit together when the second switch transistor Q2 is turned on. The equivalent inductance of the primary edge winding of transformer T is excitation inductance Lm.

At the secondary edge of transformer T, the diode D1 and the secondary edge winding Ns of transformer T are connected in series between the output voltage terminal and the reference ground of the secondary edge. The anode of diode D1 is connected to the heteronymous end of the secondary edge winding Ns, so as to rectify the induced voltage inverse to the excitation voltage of transformer T to provide DC output voltage Vo. The output capacitor Co is connected between the voltage output terminal and the reference ground of the secondary edge, to filter the DC output voltage Vo to obtain a smooth voltage waveform.

Preferably, the flyback converter further comprises a sampling resistor Rcs connected between the source of the second switch transistor Q2 and the reference ground for, when the first switch transistor Q1 is turned on and the second switch transistor Q2 is turned off, obtaining the current flowing through the first switch transistor Q1. Preferably, in power supply application with small power, it may use the leakage inductor of transformer T to replace the first inductor Lk.

Figure 2:
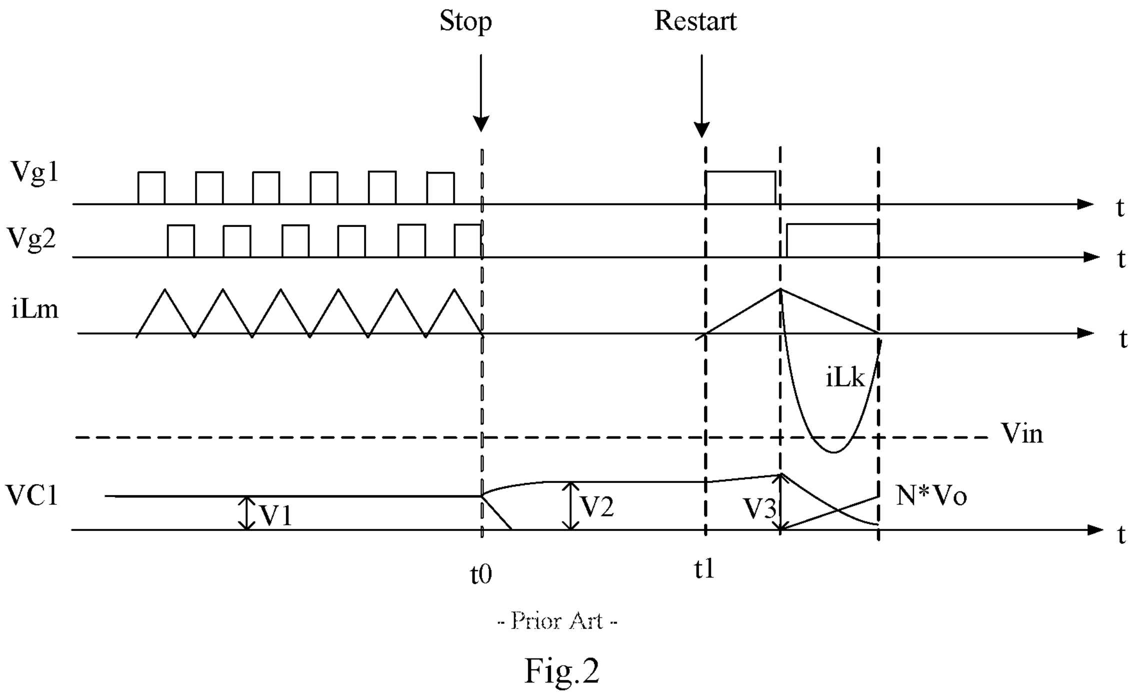
FIG. 2 shows a work waveform of the flyback converter shown in FIG. 1*a* and FIG. 1*b;*

FIG. 2 shows a work waveform of the flyback converter shown in FIGS. 1*a* and 1*b*. In the drawing, Vg1 and Vg2 represent the switch control signals of the first switch transistor Q1 and the second switch transistor Q2 respectively, and iLm and iLk represent the excitation current flowing through the excitation inductor Lm and the resonance current flowing through the first inductor Lk respectively.

Before time t0, the flyback converter works in a normal state. Under the control of the switch control signals Vg1 and Vg2, the first switch transistor Q1 and the second switch transistor Q2 are turned on and off according to, e.g., the predetermined switch cycle in a complementary way, and the node voltages of the first switch transistor Q1 and the second switch transistor Q2 are square wave signals with the amplitude values being the input voltage Vin. When the first switch transistor Q1 is turned on and the second switch transistor Q2 is turned off, the input voltage Vin charges the first inductor Lk, the excitation inductor Lm, and the first capacitor C1, and the voltage VC1 at the two ends of the first capacitor C1 rises. When the first switch transistor Q1 is turned off and the second switch transistor Q2 is turned on, the resonance circuit works, and the first inductor Lk, the excitation inductor Lm, and the first capacitor C1 discharge by way of providing resonance current, and the voltage VC1 at the two ends of the first capacitor C1 is reduced; the electric energy is transferred from the primary edge to the secondary edge. It may adjust the DC output voltage Vo by adjusting the duty cycle of the switch control signal. In an alternative embodiment, the first switch transistor Q1 and the second switch transistor Q2 may be turned on and off according to the predetermined switch cycle in a non-complementary way.

In a continuous switch cycle, voltage VC1 at the two ends of the first capacitor C1 is substantially maintained at voltage V1, and voltage N*Vo at the two ends of the primary edge winding Np of transformer T is also substantially maintained at voltage V1.

During time period from time t0 to t1, the flyback converter stops work, and the first switch transistor Q1 and the second switch transistor Q2 are both in the turned-off state. Here, the input voltage Vin may still be applied on the input terminal of the flyback converter, and the parasitic capacitance of the first switch transistor Q1 and the second switch transistor Q2 share the voltage, wherein the voltage at the two ends of the parasitic capacitance of the second switch transistor Q2 is V2. Meanwhile, the input voltage Vin charges the first capacitor C1 to voltage V2 through the primary edge winding Np of the transformer T. The first capacitor C1 may keep the charges for a period of time when the flyback converter stops work.

After time t1, the flyback converter is restarted to the normal state. During the first switch cycle after the restart, when the first switch transistor Q1 is turned on and the second switch transistor Q2 is turned off, the input voltage Vin charges the first capacitor C1 to make voltage VC1 at the two ends of the first capacitor C1 rise to voltage V3. When the first switch transistor Q1 is turned off and the second switch transistor Q2 is turned on, the resonance circuit formed of the first capacitor C1 and the first inductor Lk works, so as to generate resonance current iLk.

The amplitude of the resonance current iLk is positively correlated to the voltage at the two ends of the first capacitor C1, as shown in formula (1), $$iLk\_max = \sqrt{\left(\frac{VC1\_ini - N * Vo\_ini}{Z}\right)^2 + iLK\_ini^2} \approx \sqrt{\left(\frac{V3}{Z}\right)^2 + iLK\_ini^2}$$

Wherein, iLk_init and iLk_max represent the initial resonance current when the flyback converter is restarted and the maximum resonance circuit after the restart, and VC1_ini and V3 represent the initial voltage at the two ends of the first capacitor C1 when the flyback converter is restarted and the maximum voltage after the restart; Vo_ini represents the output voltage when the flyback converter is restarted, and N denotes a turn ratio of the primary edge winding and the secondary edge winding of transformer T.

When the flyback converter is restarted, the first capacitor C1 has stored charges; during the first switch cycle of the restart, voltage V3 at the two ends of the first capacitor C1 may be too large. It can be known from formula (1), the maximum value of the resonance current iLk will be increased correspondingly, and even the maximum value of the resonance current iLk may exceed the safe work current of the second switch transistor Q2, to damage the second switch transistor Q2.

In the application scenario of the flyback converter, e.g., scenarios of input voltage power failure, abnormal occurrence, insufficient power supply, the flyback converter may stop work. At this time, the voltage of the first capacitor VC1 is maintained at the voltage amplitude of V2. After the input voltage is powered on or the abnormal protection is released, the flyback converter is restarted. In the prior art flyback converter, since the first capacitor C1 is stored with charges before restart, it is possible to generate excessive resonance current during the restart so as to damage the second switch transistor Q2, to make the reliability of the flyback converter be worse.

Figure 3:
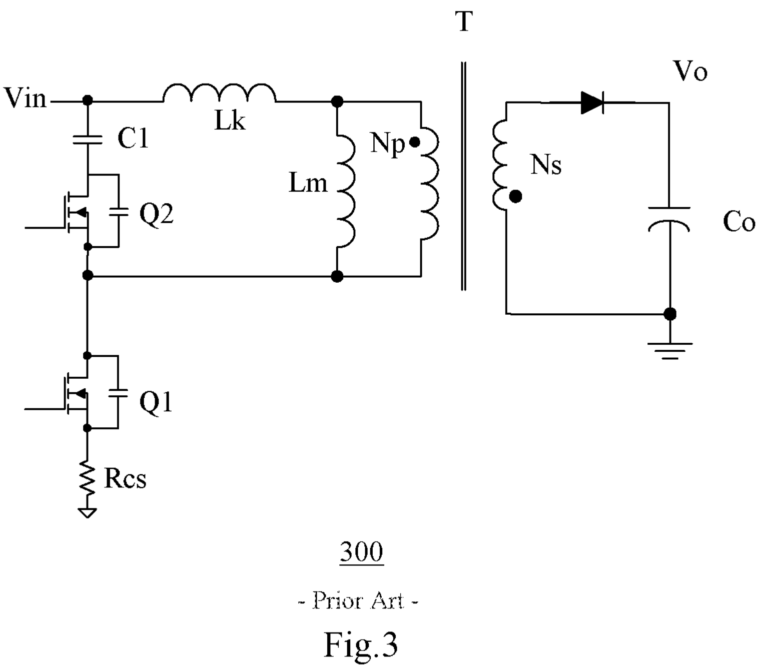
FIG. 3 shows a circuit block diagram of the active clamp flyback converter according to prior art.

FIG. 3 shows a circuit block diagram of the active clamp flyback converter according to the prior art. For clarity, it merely shows the main circuit of the flyback converter, and does not show a switch control circuit for providing the switch transistor with switch control signals.

In the active clamp flyback converter shown in FIG. 3, the flyback converter 100 comprises a transformer T with a primary edge winding Np and a secondary edge winding Ns, switch transistors Q1 and D2, a first inductor Lk and a first capacitor C1 located at the primary edge of transformer T, diode D1 and output capacitor Co located at the secondary edge of transformer T.

At the primary edge of transformer T, the first inductor Lk, the primary edge winding Np of transformer T, and the first switch transistor Q1 are sequentially connected in series between the voltage input terminal and the reference ground of the primary edge, the first capacitor C1 and the second capacitor Q2 are sequentially connected in series between the voltage input terminal and the first switch transistor Q1. In a possible embodiment, the first switch transistor Q1 and the second switch transistor Q2 are both NMOS field effect transistors. The first capacitor C1 and the second capacitor Q2 form an active clamp circuit. When the first switch transistor Q1 is turned off and the second switch transistor Q2 is turned on, the primary edge winding Np of the transformer T, the first inductor Lk, and the first capacitor C1 form a resonance circuit, and the equivalent inductance of the primary edge of the transformer T in the resonance circuit is the excitation inductance Lm.

At the secondary edge of transformer T, diode D1 and the secondary edge winding Ns of transformer T are connected in series between the voltage output terminal and the reference ground of the secondary edge. The anode of the diode D1 is connected to the heteronymous end of the secondary edge winding Ns, so as to rectify the induced voltage inverse to the excitation voltage of the of the transformer T, to provide the DC output voltage Vo. The output capacitor Co is connected between the voltage output terminal and the reference ground of the secondary edge, so as to filter the DC output voltage Vo to obtain a smooth voltage waveform.

Preferably, the flyback converter further comprises a sampling resistor Rcs connected between the source of the first switch transistor Q1 and the reference ground for, when the first switch transistor Q1 is turned on and the second switch transistor Q2 is turned off, obtaining the current flowing through the first switch transistor Q1. Preferably, in small-power power supply applications, it may use the leakage inductor of transformer T to replace the first inductor Lk.

In the application scenarios of the active clamp flyback converter, if there are situations like input voltage power failure, abnormality occurrence, and insufficient power supply, the active clamp flyback converter may stop work. The prior art active clamp flyback converter, refer to FIG. 2, since the first capacitor C1 is stored with charges before restart, may generate excessive resonance current during the restart after stop work, to make the reliability of the active clamp flyback converter become worse.

In the active clamp flyback converter, the function of the first capacitor C1 is not only used as the clamp capacitor, but also used as the resonance capacitor in the resonance circuit. The first capacitor C1 may absorb the leakage inductance energy, so as to inhibit the peak voltage of the flyback converter and increase circuit efficiency. Meanwhile, the work principle of the resonance circuit is similar to that of the non-symmetric half-bridge flyback converter.

Figure 4:
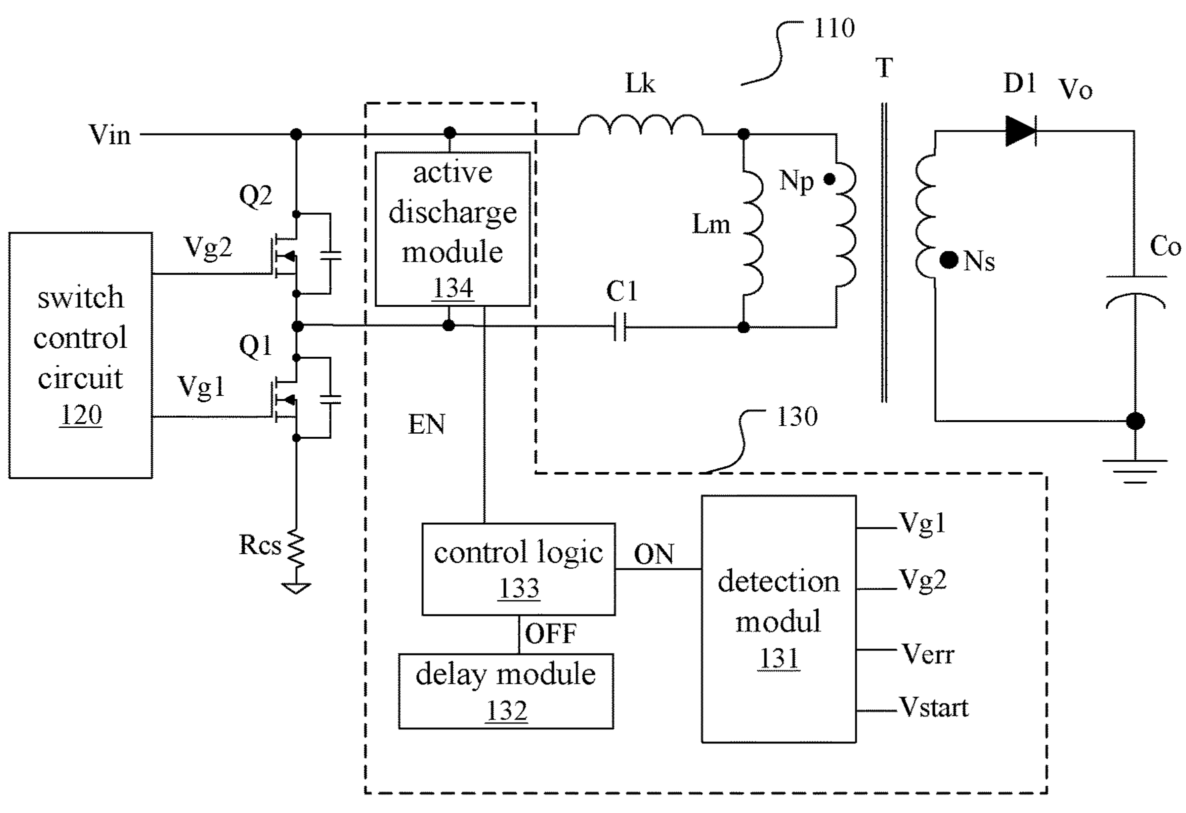
FIG. 4 shows a circuit block diagram of the symmetric half-bridge topology of the flyback converter according to the first embodiment of the present disclosure.

FIG. 4 shows a non-symmetric half-bridge topology circuit block of the flyback converter according to the first embodiment of the present disclosure. In the non-symmetric half-bridge topology shown in FIG. 4, the flyback converter 400 comprises a main circuit 110, a switch control circuit 120, and a protection circuit 130.

The main circuit 110 of the flyback converter 400 comprises a transformer T with a primary edge winding Np and a secondary edge winding Ns, switch transistors Q1 and Q2, the first inductor Lk, and the first capacitor C1 located at the primary edge of transformer T, and diode D1 and output capacitor Co located at the secondary edge of transformer T.

At the primary edge of transformer T, the first switch transistor Q1 and the second switch transistor Q2 are sequentially connected between the voltage input terminal and the reference ground of the primary edge. In a possible embodiment, the first switch transistor Q1 and the second switch transistor Q2 are both NMOS field effect transistors. The primary edge winding Np of transformer T, the first inductor Lk, and the first capacitor C1 are connected in series between the source and the drain of the second switch transistors Q2, and form a resonance circuit together when the second switch transistor Q2 is turned on. The equivalent inductance of the primary edge winding of transformer T in the resonance circuit is the excitation inductance Lm.

At the secondary edge of transformer T, the diode D1 and the secondary edge winding Ns of transformer T are connected in series between the voltage output terminal and the reference ground of the secondary edge. The anode of diode D1 is connected to the heteronymous end of the secondary edge winding Ns, so as to rectify the induced voltage inverse to the excitation voltage of the transformer T, so as to provide the DC output voltage Vo. The output capacitor Co is connected between the voltage output terminal and the reference ground of the secondary edge, and filters the DC output voltage to obtain a smooth voltage waveform. In an alternative embodiment, it may use the synchronous rectifying switch transistor to replace the diode D1.

Preferably, the flyback converter further comprises a sampling resistor Rcs connected between the source of the first switch transistor Q1 and the reference ground for, when the first switch transistor Q1 is turned on and the second switch transistor Q2 is turned off, obtaining the current flowing through the first switch transistor Q1. Preferably, in small-power power supply applications, it may use the leakage inductor of transformer T to replace the first inductor Lk.

The switch control circuit 120 of the flyback converter 400 respectively provides the switch control signals Vg1 and Vg2 of the first switch transistor Q1 and the second switch transistor Q2.

Under the control of the switch control signals Vg1 and Vg2, the first switch transistor Q1 and the second switch transistor Q2 are, e.g., according to the predetermined switch cycle, turned on and off in a complementary way. When the first switch transistor Q1 is turned on and the second switch transistor Q2 is turned off, the node voltage of the first switch transistor Q1 and the second switch transistor Q2 are square wave signals, and the first capacitor is charged to make the voltage VC1 at the two ends of the first capacitor C1 rise. When the first switch transistor Q1 is turned off and the second switch transistor Q2 is turned on, the resonance circuit works, and the first capacitor C1 discharges by way of providing resonance current, to transfer the electric energy from the primary edge of the transformer to the secondary edge. The adjustment of the DC output voltage Vo is realized by adjusting the duty cycle of the control signal. In an alternative embodiment, the first switch transistor Q1 and the second switch transistor Q2 can be turned on and off in a non-complementary way according to the predetermined switch cycle.

The protection circuit 130 of the flyback converter 400 comprises an active discharge module 134. The discharge control circuit of the active discharge module 134 comprises a detection module 131, a delay module 132, and a control logic 133. The active discharge module 134 is connected between the first current terminal and the second current terminal of the second switch transistor Q2, and the active discharge module 134 provides a discharge path of the resonance circuit. The active discharge module 134 provides a discharge path of the resonance circuit. The active discharge module 134 comprises, e.g., any one of an independent switch transistor, switch transistors and resistors which are connected with each other in series, switch transistors and current sources which are connected with each other in series.

The detection module 131 is for detecting the work state of the flyback converter, for generating a turning-on signal ON when the flyback converter stops work. The delay module 132 is for, when the turning-on signal ON is valid, starting the delay, and generating the turning-off signal OFF when the delay achieves the predetermined time period. The control logic 133 generates the discharge enabling signal EN according to the turning-on signal ON and the turning-off signal OFF. The active discharge module 134 controls the turning-on and turning-off of the discharge path according to the valid state of the discharge enabling signal EN.

In this embodiment, the detection module 131 receives the switch control signal Vg1 of the first switch transistor Q1 and the switch control signal Vg2 of the second switch transistor Q2; when the duration time that both the switch control signal Vg1 of the first switch transistor Q1 and the switch control signal Vg2 of the second switch transistor Q2 are in an invalid state exceeds at least one switch cycle, the detection module 131 determines that the flyback converter stops work, and then turns on the discharge path for a predetermined period of time.

In an alternative embodiment, the detection module 131 receives the system power-on signal Vstart, and turns on the discharge path for a determined time period before the system restart is finished. In another alterative embodiment, the detection module 131 receives the system error signal Verr, and thus the detection module determines that the flyback converter will do system restart due to the system error, and the discharge path is turned on for a predetermined time period before the system restart is finished.

In this embodiment, the delay module 132 is for, when the time delay achieves the determined time period, generating the turning-off signal OFF, so as to control the discharge time period of the first capacitor C1.

In an alternative embodiment, the detection module 131 receives the switch control signal Vg1 of the first switch transistor Q1 and the switch control signal Vg2 of the second switch transistor Q2. When the switch control signal Vg1 of the first switch transistor Q1 and the switch control signal Vg2 of the second switch transistor Q2 are restored to the work state of complementary turning-on and turning-off according to the switch cycle, the detection module 131 determines that the flyback converter restart is finished, and then the discharge path is disconnected.

During the time period from the flyback converter stops work to restarting, the discharge path of the active discharge module 134 is turned on for at least the predetermined time period, so as to discharge the resonance circuit. In the normal work state of the flyback converter, the discharge path of the active display module 134 is disconnected, so the resonance circuit works normally.

When the flyback converter according to the embodiment of the present disclosure is restarted, the resonance circuit has pred-discharged, and thus during the first switch cycle of the restart, the voltage at two ends of the first capacitor C1 is reduced to the safe value, and it can well control the maximum value of the resonance current iLk be lower than the safe work current of the second switch transistor Q2, thus protecting the second switch transistor Q2, and enhancing the reliability of the flyback converter.

Figure 5:
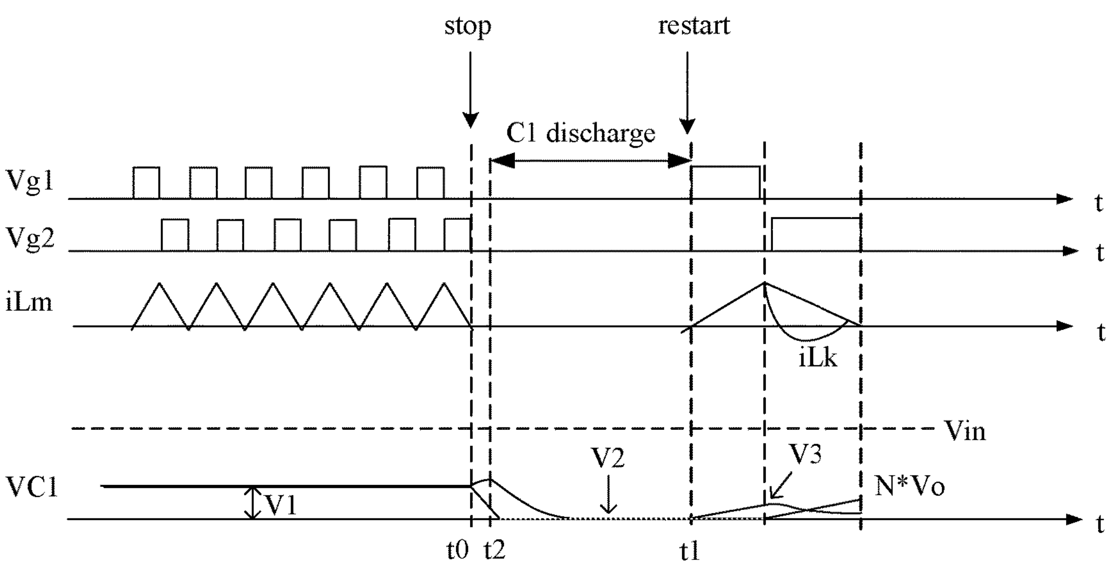
FIG. 5 shows a work waveform of the flyback converter shown in FIG. 4.

FIG. 5 shows the work waveform of the flyback converter shown in FIG. 4. In the drawings, Vg1 and Vg2 represent the switch control signals of the first switch transistor Q1 and the second switch transistor Q2 respectively, and iLm and iLk represent the excitation current flowing through the excitation inductor Lm and the resonance current flowing through the first inductor Lk.

Before time t0, the flyback converter works in the normal state. Under the control of the switch control signal Vg1 and Vg2, the first switch transistor Q1 and the second switch transistor Q2 are turned on and off in a complementary way, e.g., according to the predetermined switch cycle. The node voltages of the first switch transistor Q1 and the second switch transistor Q2 are square wave signals of which the amplitude values are the input voltage Vin. When the first switch transistor Q1 is turned on and the second switch transistor Q2 is turned off, the input voltage Vin charges the first inductor Lk, the excitation inductor Lm, and the first capacitor C1, and the voltage VC1 at the two ends of the first capacitor C1 rises. When the first switch transistor Q1 is turned off and the second switch transistor Q2 is turned on, the resonance circuit works, and the first inductor Lk, the excitation inductor Lm, and the first capacitor C1 discharge by way of providing resonance current; the voltage VC1 at the two ends of the first capacitor C1 is reduced, and the electric energy is transmitted from the primary edge of the transformer to the secondary edge. The adjustment of the DC output voltage Vo is realized by adjusting the duty cycle of the switch control signals.

In the continuous switch cycle, the voltage VC1 at the two ends of the first capacitor C1 is substantially maintained at voltage V1, and the voltage N*Vo at the two ends of the primary edge winding Np of the transformer T is also substantially maintained at voltage V1.

At the time period from time t0 to t1, the flyback converter stops work, and the first switch transistor Q1 and the second switch transistor Q2 are both in the turned-off state. Here, the input voltage Vin may still be applied on the input terminal of the flyback converter, and the parasitic capacitance of the first switch transistor Q1 and the second switch transistor Q2 share the voltage, wherein the parasitic capacitance of the second switch transistor Q2 is V2. Meanwhile, the input voltage Vin charges the first capacitor Ct to the raised voltage. Different from the prior art flyback converter, at time t2 of this time period, the discharge path of the resonance circuit is turned on, and the first capacitor C1 discharges to release charges, and the first capacitor C1 is discharged to the reduced voltage V2. The discharge path of the first capacitor C1 corresponds to the time period from time t2 to t1. At time t1, the discharge path of the resonance circuit is disconnected, and the first capacitor C1 starts to work as the resonance capacitor, and at this time, the first capacitor C1 is close the total discharge, and voltage V2 is close to zero voltage.

At time t1, the flyback converter restarts to normal state. In the first switch cycle after the restart, when the first switch transistor Q1 is turned on and the second switch transistor is turned off, the input voltage Vin charges the first capacitor C1 to raise voltage VC1 at the two ends of the first capacitor C1 to voltage V3. When the first switch transistor Q1 is turned off and the second switch transistor Q2 is turned on, the resonance circuit formed of the first capacitor C1 and the first inductor Lk works, so as to generate the resonance current iLk.

When the flyback converter restarts, the charges stored in the resonance circuit have been discharged during the discharge phase. The first capacitor C1 may be discharged to zero voltage or make the resonance current be smaller than the first voltage value of the threshold. As shown in formula (1), the amplitude of the resonance current iLk is positively correlated to the voltage amplitude at two ends of the first capacitor C1. During the first switch cycle of the restart, voltage V3 at the two ends of the first capacitor C1 has been reduced prominently. The maximum value of the resonance current iLk will be correspondingly reduced to be smaller than the safe work current of the second switch transistor Q2, and thus it can protect the second switch transistor Q2. The voltage threshold of the first capacitor C1 can be set to a current value to make the second switch transistor Q2 work safely, and it can be set according to the performance coefficient of the second switch transistor Q2.

In the application scenarios of the flyback converter, e.g., conditions of input voltage power failure, abnormality occurrence, insufficient power supply, the flyback converter may stop work. At this time, the voltage of the first capacitor VC1 is maintained at the voltage amplitude of V2. After the input voltage is powered on or the abnormal protection is released, the flyback converter is restarted. In the flyback converter according to the embodiment of the present disclosure, since the first capacitor C1 releases charges during the discharge phase before the restart, it may reduce the restart resonance current to protect the second switch transistor Q2 during the restart, so as to improve the reliability of the flyback converter.

FIG. 6 shows an equivalent circuit diagram of the discharge module in the flyback converter shown in FIG. 4. For clarify, the drawing merely shows the switch transistor in the resonance circuit of the flyback converter and the active discharge module in the protection circuit, but does not show other parts of the main circuit of the flyback converter, does not show the switch control circuit for providing the switch transistor with switch control signals, nor shows the discharge control circuit for providing the active discharge module with discharge enabling signal.

See FIG. 6, the main circuit of the flyback converter, e.g., uses the circuit topology shown in FIG. 1*b*, wherein the second switch transistor Q2 and the first switch transistor Q1 are sequentially connected in series between the input terminal of the flyback converter and the reference ground. Specifically, the first current terminal of the second switch transistor Q2 is connected to the input terminal, and the second current terminal of the first switch transistor Q1 is connected to the reference ground, and the second current terminal of the second switch transistor Q2 is connected to the first current terminal of the first switch transistor Q1. Preferably, the second current terminal of the first switch transistor Q1 is connected to the ground through the sampling resistor Rcs. The active discharge module 134 comprises a resistor Ra and a switch Sa connected in series between the first current terminal and the second current terminal of the second switch transistor Q2. The switch Sa, e.g., is a switch transistor selected from the bi-polar transistor or field effect transistor. When the switch Sa is turned on, a discharge path flowing through the resistor Ra is formed between the first current terminal and the second current terminal of the second switch transistor Q2. The resistor Ra is for restricting the amplitude of the discharge current.

See FIG. 7, in an embodiment of the active discharge module, the active discharge module 134 comprises a fourth switch transistor Sb and a third switch transistor Sc which are cascaded, and the two are bi-polar transistors. The resistor Rb and the fourth switch transistor Sb are connected in series between the first terminal of the first capacitor C1 and the reference ground, and the resistor Rc and the third switch transistor Sc are connected in series between the first terminal of the first capacitor C1 and the reference ground. Specifically, the emitter of the third switch transistor Sc is connected to the reference ground, and the collector is connected to the resistor Rc; the emitter of the fourth switch transistor Sb is connected to the reference ground, and the collector is connected to the resistor Rb. The control terminal of the fourth switch transistor Sb receives the discharge enabling signal EN, and the control terminal of the third switch transistor Sc is connected to the intermediate node of the resistor Rb and the fourth switch transistor Sb. The resistance value of the resistor Rb is greater than the resistance value of Rc, and is far greater than the resistance value of Rc.

In this embodiment, the valid state of the discharge enabling signal EN of the active discharge module 134 is a low-level state. In the normal work state of the flyback converter, the discharge enabling signal EN is in high level state, and the fourth switch transistor Sb is turned on and the third switch transistor Sc is turned off; at this time, the resistance value of the resistor Rb is high, and thus a high resistance path between the first terminal of the first capacitor C1 and the reference ground is provided, to make the fourth switch transistor Sb maintain the disconnected state of the discharge path; moreover, the circuit power consumption of the active discharge module 134 in the normal work state is reduced correspondingly. After the flyback converter stops work, the discharge enabling signal EN is in a low level state, and the fourth switch transistor Sb is turned off and the third switch transistor Sc is turned on; at this time, the resistance value of the resistor Rc is low, and thus a low resistance path between the first current terminal and the second terminal of the second switch transistor Q2 is provided, to make the third switch transistor Sc substantially maintain the turned-on state of the discharge path.

In this embodiment, the active discharge module 134 uses cascaded switch transistors, which not only reduces the standby power of the active discharge module 134 in normal state, but also reduces the resistance consumption of the active discharge module 134 at the discharge phase. Further, the fourth switch transistor Sb in the active discharge module may also be used to isolate the main circuit and the discharge control circuit, and thus it can enhance the work stability of the active discharge module.

Further, refer to FIG. 7, when the flyback converter stops work, the first switch transistor Q1 and the second switch transistor Q2 are both turned off, and the intermediate node between the first switch transistor Q1 and the second switch transistor Q2 has floating ground voltage. In the preferred embodiment, the discharge control circuit further comprises a level conversion circuit, and the discharge enabling signal generated by the discharge control circuit achieves the level state with respect to the floating voltage after being processed by the level conversion circuit, and thus it can further improve the work stability of the active discharge module.

In the above embodiment, the work principle of the active discharge module 134 is illustrated with the circuit topology shown in FIG. 1*b* as an example. In an alternative embodiment, the main circuit of the flyback converter uses, e.g., the circuit topology shown in FIG. 1*a*, wherein the first switch transistor Q1 and the second switch transistor Q2 are sequentially connected in series between the input terminal of the flyback converter and the reference ground. when the flyback converter stops work, the first switch transistor Q1 and the second switch transistor Q2 are both turned off, and the intermediate node between the first switch transistor Q1 and the second switch transistor Q2 has floating ground voltage. The active discharge module 134 is for providing a discharge path from the intermediate node to the reference ground, and thus the discharge enabling signal EN in the active discharge module 134 has a level state with respect to the reference ground. Based on the above principles, the active discharge module 134 may control the turning-on and -off of the discharge path based on the level state of the discharge enabling signal EN. At this time, the discharge control circuit may omit the level conversion circuit.

See to FIG. 8, in another embodiment of the active discharge module, the active discharge module 234 comprises a fourth switch transistor Sb and a third switch transistor Sc which are cascaded; the fourth switch transistor Sb is a field effect transistor, and the third switch transistor Sc is a bi-polar transistor. The resistor Rc and the third switch transistor Sc are connected in series between the first terminal and the second terminal of the first capacitor C1, and the resistor Rb and the fourth switch transistor Sb are connected in series between the control terminal of the third switch transistor Sc and the reference ground. Specifically, the emitter of the third switch transistor Sc is connected to resistor Rc, and the collector is connected to the second terminal of the first capacitor C1; the source of the fourth switch transistor Sb is connected to the reference ground, and the drain is connected to resistor Rb. Therefore, a positive PN node is formed between the first terminal of the first capacitor C1 and its own control end, such that when the control end is connected to the reference ground, the third switch transistor Sc is turned on, so as to turn on the discharge path. The resistance value of the resistor Rb may be greater than, smaller than, or equal to the resistance value of Rc. The control end of the fourth switch transistor Sb receives the discharge enabling signal EN.

In this embodiment, the valid state of the discharge enabling signal EN of the active discharge module 234 is high level state. During the normal work state of the flyback converter, the discharge enabling signal EN is in a low level state; the fourth switch transistor Sb is turned off and the third switch transistor Sc is turned off, and the third switch transistor Sc maintains the disconnected state of the discharge path. The circuit power consumption of the active discharge module 234 under the normal work state is also minimized correspondingly. After the flyback converter stops work, the discharge enabling signal EN is in a high-level state, and the fourth switch transistor Sb is turned on and the third switch transistor Sc is turned on; at this time, the fourth switch transistor Sb maintains the turning-on state of the discharge path.

In this embodiment, in the state that the flyback converter stops work, the first switch transistor Q1 and the second switch transistor Q2 are both turned off, and the intermediate node between the first switch transistor Q1 and the second switch transistor Q2 has floating ground voltage. The discharge enabling signal provided by the discharge control module in the active discharge module 234 has a level state with respective to the reference ground. Therefore, the discharge control circuit may omit the level conversion circuit.

In this embodiment, the active discharge module 234 uses a combined circuit of different types of switch transistors, which not only minimizes the standby power consumption of the active discharge module 234 under normal state, but also reduces the resistance consumption of the active discharge module 234 during the discharge phase. Further, the fourth switch transistor Sb in the active discharge module may also be used to isolate the main circuit and the discharge control circuit, and thus it can improve the work stability of the active discharge module.

In the above embodiment, the work principle of the active discharge module 234 is illustrated with the circuit topology shown in FIG. 1*b* as an example. In an alternative embodiment, the main circuit of the flyback converter, e.g., uses the circuit topology shown in FIG. 1*a*, wherein the first switch transistor Q1 and the second switch transistor Q2 are sequentially connected in series between the input terminal of the flyback converter and the reference ground. When the flyback converter stops work, the first switch transistor Q1 and the second switch transistor Q2 are both turned off, and the intermediate node between the first switch transistor Q1 and the second switch transistor Q2 has floating ground voltage. Based on the same principles, the active discharge module 234 provides a discharge path from the intermediate node to the reference ground, and thus the discharge enabling signal EN in the active discharge module 234 has a level sate with respect to the reference ground. Based on the above principles, the active discharge module 234 may control the turning-on and -off of the discharge path based on the level state of the discharge enabling signal EN. Here, the discharge control circuit may omit the level conversion circuit.

Figure 9:
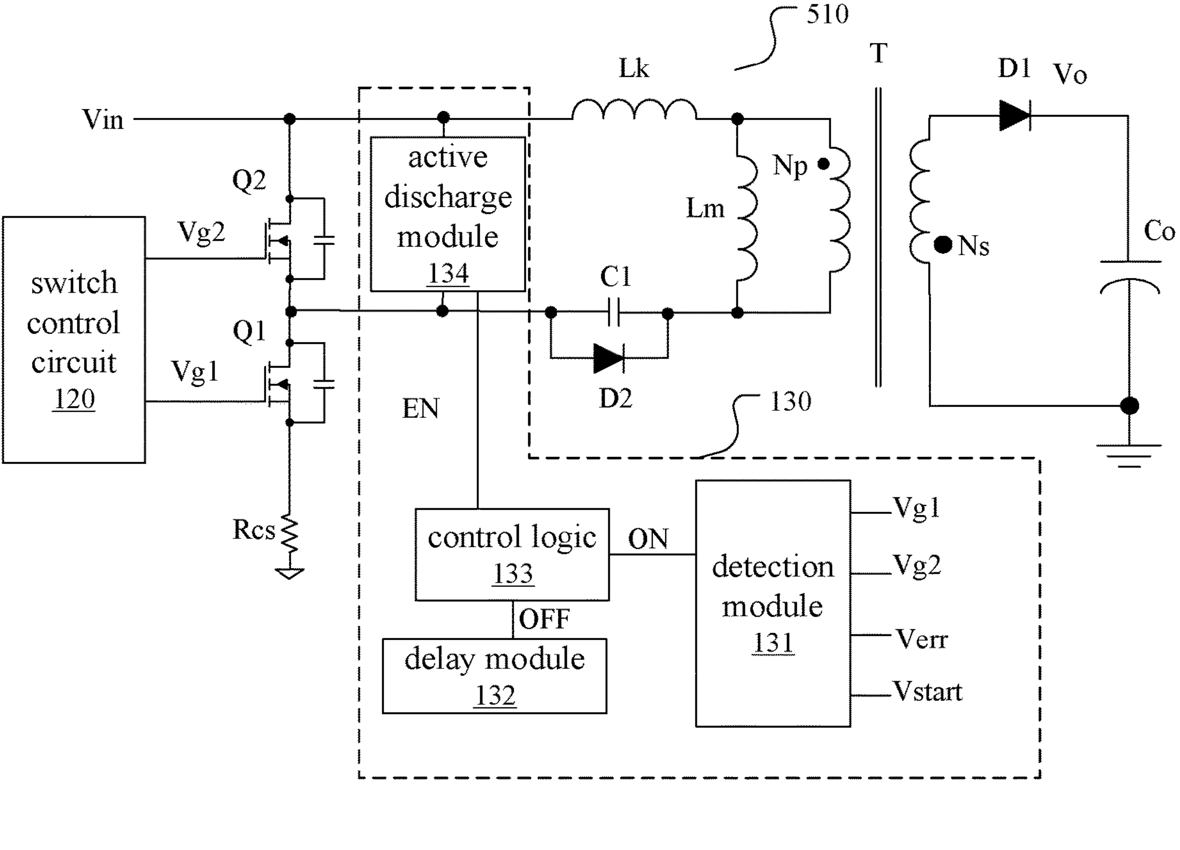
FIG. 9 shows a circuit block diagram of a non-symmetric half-bridge topology of the flyback converter according to the second embodiment of the present disclosure.

FIG. 9 shows a circuit block diagram of the non-symmetric half-bridge topology of the flyback converter according to the second embodiment of the present disclosure. The flyback converter 500 comprises a main circuit 510, a switch control circuit 120, and a protection circuit 130.

The switch control circuit 120 and the protection circuit 130 of the flyback converter 500 according to the second embodiment are the same as those of the first embodiment, and the main difference is that the main circuit 510 further comprises an additional diode D2. Diode D2 is connected to the first capacitor C1, and the cathode of the diode is connected to the intermediate node of the first capacitor and the transformer. Since the voltage at the two ends of the first capacitor before discharge is being negative at left and positive at right, when the second switch transistor Q2 or the parallelly connected active discharge module discharges, after the energy of the first capacitor C1 is transferred to the excitation inductor Lm, the excitation inductor Lm will discharge through diode D2 connected in parallel to the first capacitor C1, and it will not charge the first inductor reversely, and the energy attenuation of the circuit is faster and with high efficiency.

Figure 10:
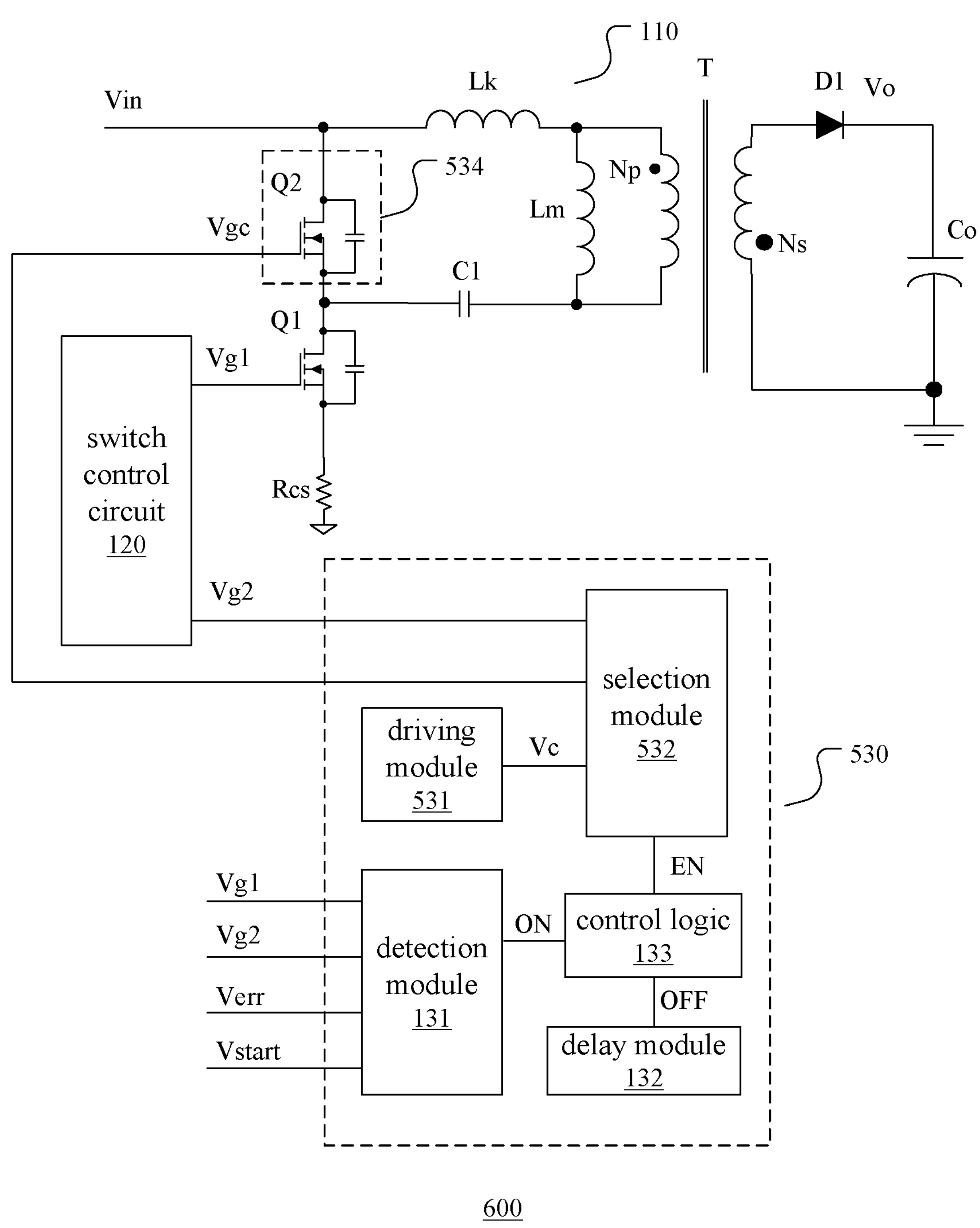
FIG. 10 shows a circuit block diagram of the non-symmetric half-bridge topology of the flyback converter according to the third embodiment of the present disclosure.

FIG. 10 shows a circuit block diagram of the non-symmetric half-bridge topology of the flyback converter according to the third embodiment of the present disclosure. In the non-symmetric half-bridge topology shown in FIG. 10, the flyback converter 500 comprises a main circuit 110, a switch control circuit 120, and a protection circuit 530.

The main circuit 110 of the flyback converter 500 comprises a transformer T with a primary edge winding Np and a secondary edge winding Ns, switch transistors Q1 and Q2 located at the primary edge of transformer T, the first inductor Lk, and the first capacitor C1, diode D1 and output capacitor Co located at the secondary edge of transformer T.

At the primary edge of transformer T, the first switch transistor Q1 and the second switch transistor Q2 are sequentially connected in series between the voltage input terminal and the reference ground of the primary edge. In a possible embodiment, the first switch transistor Q1 and the second switch transistor Q2 are both NMOS field effect transistors. The primary edge winding Np, the first inductor Lk, and the first capacitor C1 of transformer T are connected in series between the source and drain of the second switch transistor Q2, and form a resonance circuit when the second switch transistor Q2 is turned on. The equivalent inductor of the primary edge winding of transformer T in the resonance circuit is excitation inductor Lm.

At the secondary edge of transformer T, diode D1 and the secondary edge winding of transformer T are connected in series between the voltage output terminal and the reference ground of the secondary edge. The anode of diode D1 is connected to the heteronymous end of the secondary edge winding, so as to rectify the induced voltage reverse to the excitation voltage of transformer T to provide DC output voltage Vo. The output capacitor Co is connected between the voltage output terminal and the reference ground of the second edge, to filter the DC output voltage Vo to obtain a smooth voltage waveform. In an alternative embodiment, it may use the synchronous rectifying switch transistor to replace the diode D1.

Preferably, the flyback converter further comprises a sampling resistor Rcs connected between the source of the second switch transistor Q2 and the reference ground for, when the first switch transistor Q1 is turned on and the second switch transistor Q2 is turned off, obtaining the current flowing through the first switch transistor Q1. Preferably, in small-power power supply applications, it may use the leakage inductor of transformer T to replace the first inductor Lk.

The switch control circuit 120 of the flyback converter 500 provides the switch control signals Vg1 and Vg2 of the first switch transistor Q1 and the second switch transistor Q2 respectively.

Different from the flyback converter according to the first embodiment, the flyback converter 500 according to the third embodiment uses the second switch transistor Q2 as the active discharge module 534 for providing a discharge path of the resonance circuit, and thus it can omit the additional switch transistor required by the discharge of the resonance circuit.

The discharge control circuit comprises a detection module 131, a delay module 132, a control logic 133, a driving module 531, and a selection module 532. The detection module 131 is for detecting the work state of the flyback converter, for generating a turning-on signal ON when the flyback converter stops work. The delay module 132 is for, when the turning-on signal ON is valid, starting to delay, and generating a turning-off signal OFF when the delay achieves the predetermined time period. The control logic 133 generates the discharge enabling signal EN according to the turning-on signal ON and the turning-off signal OFF. The driving module 531 is for providing the driving signal Vc that the second switch transistor works in the switch or linear zone. The selection module 532 receives the switch control signal Vg2 and the driving signal Vc of the second switch transistor, and selects one of the switch control signal Vg2 and the driving signal Vc according to the discharge enabling signal EN.

When the discharge enabling signal EN is valid, under the control of the switch control signals Vg1 and Vg2, the first switch transistor Q1 and the second switch transistor Q2, e.g., are turned on and off in a complementary way according to the predetermined switch cycle. When the first switch transistor Q1 is turned on and the second switch transistor Q2 is turned off, the node voltage of the first switch transistor Q1 and the second switch transistor Q2 is a square wave signal, and the charging of the first capacitor makes voltage VC1 at the two ends of the first capacitor C1 raise. When the first switch transistor Q1 is turned off and the second switch transistor Q2 is turned on, the resonance circuit works, and the first capacitor C1 discharges by way of providing resonance current, to transfer the electric energy from the primary edge of the transformer to the secondary edge. The adjustment of the DC output voltage Vo is realized by adjusting the duty cycle of the switch control signal. In an alternative embodiment, the first switch transistor Q1 and the second switch transistor Q2 are turned on an off in a non-complementary way according to the predetermined switch cycle.

When the discharge enabling signal EN is valid, the second switch transistor Q2 is turned on continuously and conducts constant-current discharge. The second switch transistor Q2 works in different states according to the valid state of the discharge enabling signal, and thus it can control the turning-on and -off of the discharge path.

In this embodiment, the detection module 131 receives the switch control signal Vg1 of the first switch transistor Q1 and the switch control signal Vg2 of the second switch transistor Q2; when the duration time that both the switch control signal Vg1 of the first switch transistor Q1 and the switch control signal Vg2 of the second switch transistor Q2 are in valid state exceeds at least one switch cycle, the detection module 131 determines that the flyback converter stops work, and then turns on the discharge path for a predetermined time period.

In an alternative embodiment, the detection module 131 receives the system power on signal Vstart, and before the system restart is finished, it turns on the discharge path for a predetermined time period. In another alternative embodiment, the detection module 131 receives the system error signal Verr, and thus detection module 131 determines that the flyback converter will restart the system due to system error, and turns on the discharge path for a predetermined time period before the system restart is finished.

In this embodiment, the delay module 132 is for generating the turning-off signal OFF when the delay achieves the predetermined time period, so as to control the discharge time period of the first capacitor C1.

In an alternative embodiment, the detection module 131 receives the switch control signal Vg1 of the first switch transistor Q1 and the switch control signal Vg2 of the second switch transistor Q2. When the switch control signal Vg1 of the first switch transistor Q1 and the switch control signal Vg2 of the second switch transistor Q2 are restored to the work state of complementary turning-on and turning-off according to the switch cycle, the detection module 131 determines that the flyback converter restart is finished, and then disconnects the discharge path.

During the time period from the flyback converter stops work to restart, the discharge path of the resonance circuit is turned on for at least the predetermined time period, so as to discharge the resonance circuit. When the flyback converter is in the normal work state, the discharge path of the resonance circuit is disconnected, so the resonance circuit works normally.

In the above embodiment, the second switch transistor Q2 is also used as an active amplification module. The protection circuit 530 may also control the second switch transistor Q2 to turn on again before the first switch transistor Q1 is turned on, so that the drain/source voltage of the first switch transistor Q1 is close to zero before turning-on, to realize the zero-voltage turning on of the first switch transistor. At the discharge phase of the resonance circuit, the second switch transistor Q2 works in the linear zone, so that the drain/source parasitic capacitance voltage of the first switch transistor Q1 discharges; preferably, a resistor can be connected in series on the path where the second switch transistor is located, to control the discharge current amplitude. In an alternative embodiment, the second switch transistor can also work in the switch state, and after the first switch transistor and the second switch transistor are both turned off, the protection circuit immediately turns on the second switch transistor to conduct switch discharge; at this time, the output voltage Vo still has voltage amplitude, and the voltage drop on the first capacitor C1 and the excitation inductor Lm is not big, and the resonance current is not big, so the consumption at this time is very small.

In an alternative embodiment, the active discharge module may comprise an additional transistor. During the discharge phase of the resonance circuit, the additional transistor works in the switch or linear state, such that the drain/source parasitic capacitance of the first switch transistor Q1 is discharged; preferably, a resistor can be connected in series on the path where the second switch transistor is located, to control the discharge current amplitude.

When the flyback converter according to the embodiments of the present disclosure is restarted, the resonance circuit has pre-discharged; thus, in the first switch cycle of the restart, the voltage at two ends of the first capacitor C1 has reduced to the safe value, it can well control the maximum value of the resonance current iLk to be lower than the safe work current of the second switch transistor, and thus it can protect the second switch transistor Q2, improve the reliability of the flyback converter.

In another embodiment, the flyback converter comprises a transformer, a first switching transistor and a second switching transistor located at the primary side of the transformer and connected between an input terminal of the flyback converter and a reference ground, and a first capacitor and a first inductor forming a resonance circuit in the on state of the second switching transistor; and the control method comprising: providing a discharge path of the first capacitor; controlling intermittent conduction of the discharge path before the flyback converter is restarted.

Preferably, controlling a gradually increasing time of intermittent conduction of said discharge path.

Preferably, controlling a gradually increasing time of intermittent conduction of said discharge path comprising: controlling the time of each conduction of said discharge path to be a first predetermined threshold, said first predetermined threshold increasing incrementally as the number of conduction increases.

Preferably, controlling a gradually increasing time of intermittent conduction of said discharge path comprising: controlling said discharge path to conduct intermittently in each operational phase, the time of each conduction of said discharge path within each operational phase being a second predetermined threshold, said second predetermined threshold increasing with the increase of said operational phase.

Preferably, obtaining a time signal based on the voltage of said first capacitor, wherein said time signal characterizes the time of each conduction of said discharge path, and said time signal characterizes a negative correlation between the time of conduction and the voltage of said first capacitor.

Preferably, said discharge path comprises a switching transistor and a resistor connected in series, or comprises a switching transistor.

Preferably, said discharge path comprises an active discharge module located between the first current terminal and the second current terminal of said second switching transistor, controlling the turn-off time of said active discharge module according to the current flowing through said first inductor.

Preferably, said discharge path comprises an active discharge module located between the first current terminal and the second current terminal of said second switching transistor, controlling the turn-off time of said active discharge module according to the current flowing through said first inductor and the turn-on time of said active discharge module.

The present invention proposes to control intermittent conduction of the discharge path to release charges stored in the first capacitor before the flyback converter restart, so as to prevent a large resonance current from damaging the second switch transistor during the flyback converter restarting.

In the above embodiment, when the second switching transistor conducts intermittently to provide the discharge path, it can also prevent a large resonance current from damaging the second switching transistor, which is generated due to the discharge path being on for too long.

In the embodiments described in great details in the above text, the work principles of the present disclosure are merely further illustrated with the flyback converter of non-symmetric half-bridge topology as an example. However, it can be understood that the present disclosure is not restricted to this. Based on the similar work principles, the present disclosure can be directly applied in the active clamp flyback converter and have the same effect.

The above embodiments do not form the restriction of the protection scope of the technical solution. Any amendments, equivalent replacement, and improvements made within the above spirits and scopes of the above embodiments shall be included in the protection scope of the technical solutions.

What is claimed is:

1. A protection circuit of a flyback converter, wherein the flyback converter comprises a transformer, a first switch transistor and a second switch transistor located at a primary edge of the transformer and connected between an input terminal of the flyback converter and a reference ground, and a first capacitor and a first inductor forming a resonance circuit when the second switch transistor is turned on, and the protection circuit comprises:

an active discharge module, for providing a discharge path between a first current terminal and a second current terminal of the second switch transistor, and controlling turning-on and turning-off of the discharge path according to a discharge enabling signal, wherein the discharge path is connected to the second switch transistor in parallel, wherein in a normal work state of the flyback converter, the discharge path in the active discharge module is disconnected, and the resonance circuit works; before the flyback converter is restarted, the discharge path in the active discharge module is turned on for a predetermined time period to release charges stored in the resonance circuit, and reduces a resonance current after the flyback converter is restarted to a safe work current of the second switch transistor.

2. The protection circuit of claim 1, wherein the active discharge module comprises a third switch transistor and a first resistor connected between the first current terminal and the second current terminal of the second switch transistor, and the third switch transistor is connected in series with the first resistor.

3. The protection circuit of claim 2, wherein the active discharge module further comprises a fourth switch transistor and a second resistor connected in series between the first current terminal and the second current terminal of the second switch transistor, and a control end of the third switch transistor is connected to an intermediate node of the fourth switch transistor and the second resistor, and a control end of the fourth switch transistor receives the discharge enabling signal, wherein the third transistor and the fourth transistor are bipolar switch transistors, respectively.

4. The protection circuit of claim 2, wherein the active discharge module further comprises a fourth switch transistor and a second resistor connected in series between a control end of the third transistor and the reference ground, and a control end of the fourth switch transistor receives the discharge enabling signal, wherein the third switch transistor is a bipolar transistor, and the fourth switch transistor is a field effect transistor.

5. The protection circuit of claim 4, wherein the third switch transistor forms a positive PN node between a first terminal of the first capacitor and the control end of the third switch transistor, such that when the control end is connected to the reference ground, the third switch transistor is turned on so as to turn on the discharge path.

6. The protection circuit of claim 1, wherein the first switch transistor and the second switch transistor are sequentially connected in series between the input terminal of the flyback converter and the reference ground, or the second switch transistor and the first switch transistor are sequentially connected in series between the input terminal of the flyback converter and the reference ground.

7. The protection circuit of claim 1, wherein the flyback converter further comprises a second capacitor, and the second capacitor, the second switch transistor, and the first switch transistor are sequentially connected in series between the input terminal of the flyback converter and the reference ground.

8. The protection circuit of claim 7, wherein when the first switch transistor is turned off, an intermediate node between the first switch transistor and the second switch transistor has floating ground voltage.

9. The protection circuit of claim 8, further comprising a level conversion circuit for converting the discharge enabling signal from a first level with respect to the reference ground to a second level with respect to the floating ground voltage.

10. The protection circuit of claim 1, further comprising: a discharge control circuit, connected to the active discharge module, and generating the discharge enabling signal of a corresponding effective state according to the work state of the flyback converter.

11. The protection circuit of claim 10, wherein the discharge control circuit comprises:

a detection module, for detecting the work state of the flyback converter, and generating a turning-on signal and a turning-off signal before the flyback converter is restarted; and control logics, for generating the discharge enabling signal according to the turning-on signal and the turning-off signal.

12. The protection circuit of claim 11, wherein the detection module receives a first switch control signal of the first switch transistor and a second switch control signal of the second switch transistor, and generates at least one of the turning-on signal and the turning-off signal according to the first switch control signal and the second switch control signal.

13. The protection circuit of claim 12, wherein the detection module generates the turning-on signal when a duration during which both the first switch control signal and the second switch control signal are in an invalid state exceeds at least one switch cycle.

14. The protection circuit of claim 12, wherein the detection module generates the turning-off signal when it detects a complementary level state of the first switch control signal and the second switch control signal in at least one continuous switch cycle.

15. The protection circuit of claim 12, wherein the second switch transistor is also used as the active discharge module, and the discharge control circuit further comprises: a driving module, for providing a driving signal when the second switch transistor works in a switch or linear state; and a selection module, for receiving the second switch control signal and the driving signal of the second switch transistor, and selecting one of the second switch control signal and the driving signal according to the discharge enabling signal, wherein, the second switch transistor is continuously turned on and conducts constant current discharge when the discharge enabling signal is valid, and is turned on and off according to the switch cycle when the discharge enabling signal is valid.

16. The protection circuit of claim 11, wherein the active discharge module comprises an additional transistor, and the discharge control circuit further comprises:

a driving module, for providing a driving signal when the additional transistor works in a switch or linear state, wherein the additional transistor is continuously turned on and conducts constant current discharge when the discharge enabling signal is valid, and is turned off when the discharge enabling signal is invalid.

17. The protection circuit of claim 11, wherein the detection module receives a system power-on signal or system error signal, and turns on the discharge path in the active discharge module for the predetermined time period before system restart event is finished.

18. The protection circuit of claim 10, wherein the discharge control circuit comprises:

a detection module, for detecting the work state of the flyback converter, and generating a tuning-on signal before the flyback converter is restarted;

a time delay module, for starting a delay when the turning-on signal is valid, and generating a turning-off signal when the delay arrives a predetermined time period; and control logics, for generating the discharge enabling signal according to the turning-on signal and the turning-off signal.

19. The protection circuit of claim 1, wherein the protection circuit further comprises a diode, the diode is connected in parallel to the first capacitor, and a cathode of the diode is connected to an intermediate node of the first capacitor and the transformer.

20. A control method of a flyback converter, the flyback converter comprising a transformer, a first switch transistor and a second switch transistor located at a primary edge of the transformer and connected between an input terminal of the flyback converter and a reference ground, and a first capacitor and a first inductor forming a resonance circuit when the second switch transistor is turned on, and the control method comprising:

providing a discharge path between a first current terminal and a second current terminal of the second switch transistor, wherein the discharge path is connected to the second switch transistor in parallel;

in a normal work state of the flyback converter, disconnecting the discharge path to make the resonance circuit to work; and before the flyback converter is restarted, turning on the discharge path for a predetermined time period according to the discharge enabling signal to release charges stored in the resonance circuit, so as to reduce a resonance current to a safe work current of the second switch transistor after the flyback converter is restarted.

21. The control method of claim 20, wherein there is a floating ground voltage at an intermediate node of the first switch transistor and the second switch transistor when the first switch transistor is turned off, the discharge enabling signal is converted from a first level with respect to the reference ground to a second level with respect to the floating ground voltage.

22. The control method of claim 20, wherein the second switch transistor is used as an active discharge module, the control method further comprises:

obtaining a second switch control signal of the second switch transistor in a normal work cycle;

obtaining a driving signal when the second switch transistor works in a work or linear state, and selecting one of the second switch control signal and the driving signal as a control signal of the second switch transistor according to the discharge enabling signal, wherein the second switch transistor is continuously turned on and conducts constant current discharge when the discharge enabling signal is valid, and is turned on and off according to switch cycle when the discharge enabling signal is invalid.

23. The control method of claim 20, wherein a system restart event is confirmed according to a system power-on signal or a system error signal, and the discharge path is turned on for the predetermined time period before the system restart event is finished.

* * * * *